(12) United States Patent
Takizawa et al.

(10) Patent No.: US 8,096,919 B2
(45) Date of Patent: Jan. 17, 2012

(54) MOTOR CONTROL DEVICE, MOTORED VEHICLE EQUIPPED THEREWITH, AND METHOD OF CONTROLLING A MOTOR

(75) Inventors: Keiji Takizawa, Toyota (JP); Hiroshi Aihara, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 809 days.

(21) Appl. No.: 12/097,018

(22) PCT Filed: Dec. 28, 2006

(86) PCT No.: PCT/JP2006/326420
§ 371 (c)(1),
(2), (4) Date: Jun. 11, 2008

(87) PCT Pub. No.: WO2007/080819
PCT Pub. Date: Jul. 19, 2007

(65) Prior Publication Data
US 2009/0288634 A1   Nov. 26, 2009

(30) Foreign Application Priority Data

Jan. 11, 2006   (JP) .................................. 2006-003473

(51) Int. Cl.
*B60W 10/08*   (2006.01)

(52) U.S. Cl. ............................................ 477/20; 477/16
(58) Field of Classification Search ................... 477/15, 477/16, 20
See application file for complete search history.

(56) References Cited

U.S. PATENT DOCUMENTS

| 7,192,374 B2 * | 3/2007 | Kuras et al. .................... 475/153 |
| 2004/0235613 A1 * | 11/2004 | Aoki et al. ......................... 477/3 |
| 2009/0118087 A1 * | 5/2009 | Hsieh et al. ....................... 477/15 |
| 2010/0100263 A1 * | 4/2010 | Aoki et al. ........................ 701/22 |

FOREIGN PATENT DOCUMENTS

| JP | 11-122703 A | | 4/1999 |
| JP | 2003-304604 | * | 6/2000 |
| JP | 2003-304604 A | | 6/2000 |
| JP | 2001-177909 A | | 6/2001 |
| JP | 2000-184502 A | | 10/2003 |
| JP | 2005-51834 A | | 2/2005 |

\* cited by examiner

*Primary Examiner* — Ha D. Ho
(74) *Attorney, Agent, or Firm* — Sughrue Mion, PLLC

(57) ABSTRACT

When a torque control value (TR) is larger than a threshold value and vehicular speed (SV) is lower than a threshold value an upper temperature limit setting unit sets the upper temperature limit of a motor generator at an upper temperature limit (TS2) higher than a normally set upper temperature limit (TS1). A torque limitation control controls limiting a torque of the motor generator, as based on a motor temperature (T) and the upper temperature limit set by the upper temperature limit setting unit.

20 Claims, 8 Drawing Sheets

MOTOR CONTROL DEVICE, MOTORED VEHICLE EQUIPPED THEREWITH, AND METHOD OF CONTROLLING A MOTOR

TECHNICAL FIELD

The present invention relates generally to motor control devices, motored vehicles equipped therewith, and methods of controlling motors, and particularly to devices that control motors mounted in electric vehicles, hybrid vehicles, fuel cell vehicles and other motored vehicles as a source of motive power, motored vehicles equipped therewith, and methods of controlling motors.

BACKGROUND ART

Japanese Patent Laying-open No. 2003-304604 discloses a device driving a motor mounted as a source driving electric vehicles, hybrid vehicles, fuel cell vehicles and other various types of vehicles.

In this device, if a temperature detection means detects that the motor has a temperature equal to or higher than a temperature limit, a motor output control means limits the output of the motor. Herein a means for detecting a rate of change in temperature detects the rate of change in temperature of the motor and modifies a setting of the temperature limit in accordance with the rate of change detected.

More specifically, if the motor's rate of change in temperature is equal to or larger than a predetermined rate of change, the means for detecting a rate of change in temperature determines that the motor has a large increase in temperature, and accordingly the means sets the current temperature limit to be a first temperature limit, and when the motor attains the first temperature limit or higher the motor output control means limits the output of the motor.

In contrast, if the motor's rate of change in temperature is smaller than the predetermined rate of change, the means for detecting a rate of change in temperature determines that the motor has a small increase in temperature, and accordingly the means sets the current temperature limit to be a second temperature limit higher than the first temperature limit, and when the motor attains the second temperature limit or higher the motor output control means limits the output of the motor.

This device allows a vehicle to run an increased distance without limiting the output of the motor, can protect the motor from high temperature, and also allows the motor to fully exhibit its performance.

However, the motor drive device disclosed in Japanese Patent Laying-open No. 2003-304604 only limits the output of the motor in accordance with the rate of change in the temperature of the motor in view of protecting the motor from high temperature. It does not give consideration to the state of the vehicle.

For example, when a vehicle is in a state in which while it is running up hill it may fall downhill, such state should first and most of all be avoided. The above described motor drive device, despite the vehicle's such state, may prioritize protecting the motor from high temperature and stringently limit the motor's output. Thus with the above described motor drive device there is a possibility that while the vehicle is running uphill it may fall downhill.

DISCLOSURE OF THE INVENTION

The present invention has been made to overcome such disadvantage.

An object of the present invention is to provide a motor control device that can limit an output of a motor in accordance with a state of a vehicle having the motor mounted therein.

Another object of the present invention is to provide a motored vehicle equipped with a motor control device that can limit an output of a motor of the vehicle in accordance with a state of the vehicle.

Still another object of the present invention is to provide a method of controlling a motor, that can limit an output of the motor in accordance with a state of a vehicle having the motor mounted therein.

In accordance with the present invention a motor control device controls a motor generating a force driving a vehicle and includes: a temperature detection unit detecting the temperature of the motor; a torque limitation unit limiting a torque of the motor, as based on the temperature detected by the temperature detection unit and a set upper temperature limit of the motor; and a setting unit determining the upper temperature limit of the motor, as based on a state of the vehicle, and setting the determined upper temperature limit in the torque limitation unit.

The present motor control device includes a torque limitation unit that limits a torque of a motor, as based on an upper temperature limit determined as based on a state of a vehicle equipped with the motor. As such, if for example the vehicle is in a state in which while it is running uphill it may fall downhill, i.e., a state that should significantly preferentially be avoided, a set upper temperature limit can be raised to alleviate limiting the torque of the motor.

Thus the present motor control device can provide an increased possibility of preventing the vehicle from falling downhill while it is running uphill.

Preferably the state of the vehicle includes at least one of the speed of the vehicle, the torque, and a shift position.

Still preferably when the torque is larger than a first threshold value and the speed is lower than a second threshold value the setting unit sets in the torque limitation unit a second upper temperature limit higher than a normally set, first upper temperature limit.

A state with a torque larger than the first threshold value and a speed lower than the second threshold value is considered as a state in which while the vehicle is running uphill it may fall downhill. The present motor control device includes a setting unit that can set in a torque limitation unit a second upper temperature limit higher than a normally set, first upper temperature limit. A set upper temperature limit can thus be raised, and limiting a torque of the motor can thus be alleviated.

Thus the present motor control device can provide an increased possibility of preventing the vehicle from falling downhill.

Furthermore, preferably, when the shift position is in a reverse range the setting unit sets in the torque limitation unit a second upper temperature limit higher than a normally set, first upper temperature limit.

The present motor control device includes a setting unit that can set a second upper temperature limit that is higher than a normally set, first upper temperature limit in a torque limitation unit for a shift position in the reverse range. A set upper temperature limit can thus be raised, and limiting a torque of the motor can thus be alleviated.

Thus the present motor control device can provide an increased possibility of preventing the vehicle from falling downhill while it is proceeding tail first to run uphill.

Furthermore in accordance with the present invention a motor control device controls a motor generating a force driving a vehicle and includes: a temperature detection unit detecting the temperature of the motor; a torque limitation unit limiting a torque of the motor, as based on the temperature detected by the temperature detection unit and an upper temperature limit of the motor, at a set reduction rate per unit time; and a setting unit determining the reduction rate, as based on a state of the vehicle, and setting the determined reduction rate in the torque limitation unit.

The present motor control device includes a torque limitation unit that can limit a torque of a motor at a reduction rate per unit time as determined as based on a state of a vehicle equipped with the motor. As such, if for example the vehicle is in a state in which while it is running uphill it may fall downhill, i.e., a state that should significantly preferentially be avoided, the reduction rate can for example be reduced to alleviate limiting the torque of the motor.

Thus the present motor control device can provide an increased possibility of preventing the vehicle from falling downhill while it is running uphill.

Preferably the state of the vehicle includes at least one of the speed of the vehicle, the torque, and a shift position.

Still preferably, when the torque limitation unit decreases the torque the torque limitation unit decreases the torque to a limit value determined by the detected temperature, and when the torque is larger than a first threshold value and the speed is lower than a second threshold value the setting unit sets the reduction rate in the torque limitation unit so that the period of time that passes after the torque starts to decrease before the torque reaches the limit value is longer than normal.

A state with a torque larger than the first threshold value and a speed lower than the second threshold value is considered as a state in which while the vehicle is running uphill it may fall downhill. The present motor control device includes a setting unit that can set a reduction rate in a torque limitation unit so that the period of time that passes after the torque starts to decrease before the torque reaches a limit value is longer than normal. Limiting the torque of the motor can thus be alleviated.

Thus the present motor control device can thus provide an increased possibility of preventing the vehicle from falling downhill.

Preferably, when the torque limitation unit decreases the torque the torque limitation unit decreases the torque to a limit value determined by the detected temperature, and when the shift position is in a reverse range the setting unit sets the reduction rate in the torque limitation unit so that the period of time that passes after the torque starts to decrease before the torque reaches the limit value is longer than normal.

The present motor control device includes a setting unit that, for a shift position in a reverse range, can set a reduction rate in a torque limitation unit so that the period of time that passes after a torque starts to decrease before the torque reaches a limit value is longer than normal. Limiting the torque of the motor can thus be alleviated.

Thus the present motor control device can provide an increased possibility of preventing the vehicle from falling downhill while it is proceeding tail first to run uphill.

Still preferably when the torque is larger than the first threshold value and the speed is lower than the second threshold value or the shift position is in the reverse range the setting unit sets in the torque limitation unit a second reduction rate lower than a normally set, first reduction rate.

The present motor control device includes a setting unit that can set in a torque limitation unit a second reduction rate lower than a normally set, first reduction rate. This ensures that limiting the torque of the motor is alleviated.

Thus the present motor control device can provide a further increased possibility of preventing the vehicle from falling downhill.

Furthermore, preferably, when the torque is larger than the first threshold value and the speed is lower than the second threshold value or the shift position is in the reverse range, and the torque starts to decrease, the setting unit initially sets in the torque limitation unit a third reduction rate higher than a normally set, first reduction rate, and subsequently sets in the torque limitation unit a fourth reduction rate lower than the first reduction rate.

The present motor control device includes a setting unit that can set in the torque limitation unit a third reduction rate higher than a normally set, first reduction rate when a torque starts to decrease. Thus, in the first place, elevation in temperature of the motor is reduced or prevented. Thereafter the setting unit sets in the torque limitation unit a fourth reduction rate lower than the first reduction rate. This ensures that the motor's torque is decreased to a torque limit in an appropriate period of time.

The present motor control device can thus reduce or prevent elevation in temperature of the motor while the vehicle is running uphill, and also increase the possibility that the vehicle running uphill can avoid falling downhill.

Furthermore in accordance with the present invention a motored vehicle includes: a motor generating a force driving a vehicle; a wheel mechanically linked with an output shaft of the motor; and any of the motor control devices aforementioned.

Thus the present motored vehicle can provide an increased possibility of preventing the vehicle from falling downhill while it is running uphill.

Furthermore in accordance with the present invention a method of controlling a motor is a method of controlling a motor generating a force driving a vehicle, and includes a first step and a second step. The first step is determining an upper temperature limit of the motor, as based on a state of the vehicle. The second step is limiting a torque of the motor, as based on the temperature of the motor as detected and the upper temperature limit.

Thus the present invention can limit a torque of a motor in accordance with an upper temperature limit as determined in accordance with a state of a vehicle having the motor mounted therein. If for example the vehicle may fall downhill while running uphill, i.e., if the vehicle is in a state that should significantly preferentially be avoided, a set upper temperature limit can be raised to alleviate limiting the torque of the motor.

Furthermore the present invention can limit a torque of a motor at a reduction rate per unit time as determined in accordance with a state of a vehicle having the motor mounted therein. If for example the vehicle may fall downhill while running uphill, i.e., if the vehicle is in a state that should significantly preferentially be avoided, the reduction rate can for example be decreased to alleviate limiting the torque of the motor.

Thus the present invention can increase the possibility that a vehicle running uphill avoids falling downhill.

BEST MODES FOR CARRYING OUT THE INVENTION

Hereinafter an embodiment of the present invention will more specifically be described with reference to the drawings. Note that in the figures, identical or like components are identically denoted and will not be described repeatedly.

First Embodiment

Figure 1:
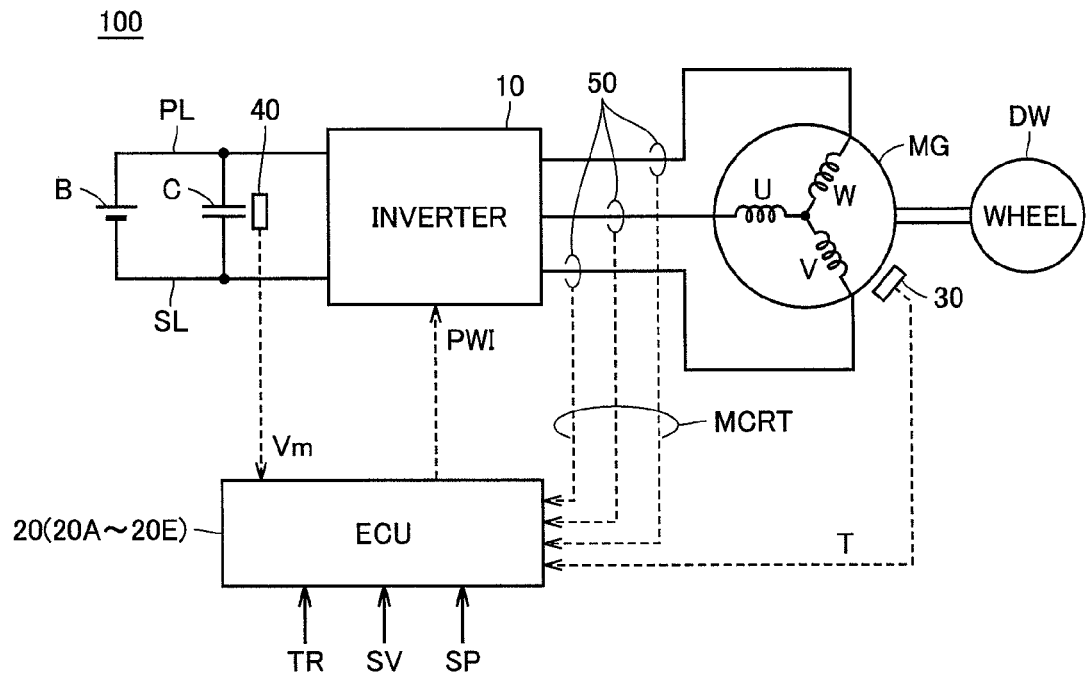
FIG. 1 is a block diagram for generally illustrating a powertrain of a motored vehicle in a first embodiment of the present invention.

FIG. 1 is a block diagram generally illustrating a powertrain of a motored vehicle in a first embodiment of the present invention. With reference to FIG. 1, a motored vehicle 100 includes an power storage device B, a power supply line PL, a ground line SL, a capacitor C, an inverter 10, a motor generator MG, and a wheel DW. Furthermore, motored vehicle 100 also includes an electronic control unit (ECU) 20, a temperature sensor 30, a voltage sensor 40, and a current sensor 50.

Power storage device B is connected between power supply line PL and ground line SL, and inverter 10 is connected to power storage device B via power supply line PL and ground line SL. Capacitor C is connected between power supply line PL and ground line SL in parallel with power storage device B. Motor generator MG includes a Y-connected, 3 phase coil as a stator coil, and is connected via a 3 phase cable to inverter 10. Motor generator MG has an output shaft mechanically linked with a shaft of rotation of wheel DW. In other words, motor generator MG is incorporated in motored vehicle 100 as an electric motor driving wheel DW.

Power storage device B is a chargeable and dischargeable, direct current power supply and for example implemented by a nickel metal hydride battery, a lithium ion buttery or a similar secondary battery. Power storage device B supplies inverter 10 with a direct current power. Furthermore power storage device B is charged with direct current power that is output from inverter 10 to power supply line PL in regeneratively braking the vehicle and thus received thereby. Note that power storage device B may be implemented by a capacitor of large capacity.

Capacitor C smoothes variation in voltage between power supply line PL and ground line SL. Inverter 10 operates in response to a signal PWI received from ECU 20 to convert a direct current voltage, which is received on power supply line PL, to a 3 phase, alternate current voltage and output the 3 phase, alternate current voltage to motor generator MG. This drives motor generator MG to generate a torque as designated. Furthermore when the vehicle is regeneratively braked, inverter 10 receives a 3 phase alternate current voltage generated by motor generator MG as it receives a force of rotation from wheel DW, and inverter 10 converts the alternate current voltage to a direct current voltage in accordance with signal PWI received from ECU 20, and outputs the direct current voltage to power supply line PL.

Motor generator MG is a 3 phase, alternate current motor and implemented for example by a 3 phase, alternate current, synchronous motor. Motor generator MG receives a 3 phase alternate current voltage from inverter 10 to generate a torque driving the vehicle. Furthermore, when the vehicle is regeneratively braked, motor generator MG generates and outputs a 3 phase alternate current voltage to inverter 10.

Temperature sensor 30 detects a motor temperature T of motor generator MG and outputs the detected motor temperature T to ECU 20. Voltage sensor 40 detects a voltage Vm across capacitor C and outputs the detected voltage Vm to ECU 20. Current sensor 50 detects a motor current MCRT flowing to the 3 phase cable connecting inverter 10 to motor generator MG and outputs the detected motor current MCRT to ECU 20.

ECU 20 receives from an external ECU (not shown) a torque control value TR for motor generator MG, a vehicular speed SV and a shift position signal SP. From torque control value TR, vehicular speed SV, shift position signal SP, motor temperature T received from temperature sensor 30, voltage Vm received from voltage sensor 40, and motor current MCRT received from current sensor 50, ECU 20 generates signal PWI for driving inverter 10, and outputs the generated signal PWI to inverter 10.

Note that torque control value TR is calculated by the external ECU as based on how much the accelerator pedal and the brake pedal are currently depressed and how the vehicle is currently running. Vehicular speed SV is calculated by the external ECU from the number of rotations of wheel DW, that of rotations of motor generator MG, and the like, as detected by a rotation sensor (not shown). Shift position signal SP is a signal indicating a position selected with a shift lever operated to select a shift range.

Figure 2:
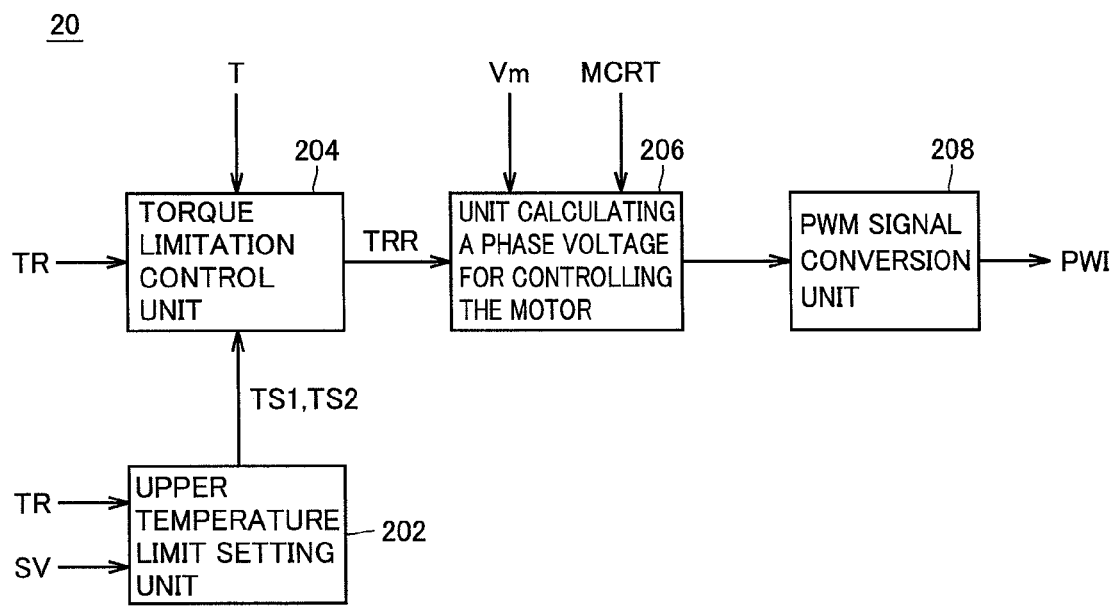
FIG. 2 is a functional block diagram of an ECU shown in FIG. 1.

FIG. 2 is a functional block diagram of ECU 20 shown in FIG. 1. With reference to FIG. 2, ECU 20 includes an upper temperature limit setting unit 202, a torque limitation control unit 204, a unit 206 calculating a phase voltage for controlling the motor, and a PWM signal conversion unit 208.

Upper temperature limit setting unit 202 sets an upper temperature limit of motor generator MG in accordance with torque control value TR and vehicular speed SV and outputs the set upper temperature limit to torque limitation control unit 204. More specifically, when torque control value TR is at most a preset threshold value TRth or vehicular speed SV is at least a preset threshold value SVth, upper temperature limit setting unit 202 sets the upper temperature limit of motor generator MG at TS1. When torque control value TR is larger than threshold value TRth and vehicular speed SV is lower than threshold value SVth, upper temperature limit setting unit 202 sets the upper temperature limit of motor generator MG at TS2 higher than TS1.

Torque limitation control unit 204 exerts torque limitation control based on motor temperature T of motor generator MG and the upper temperature limit set by upper temperature limit setting unit 202 to limit the torque output from motor generator MG. More specifically, when motor generator MG has motor temperature T approaching the upper temperature limit (TS1 or TS2) set by upper temperature limit setting unit 202, torque limitation control unit 204 decreases torque control value TR received from the external ECU, and outputs to unit 206 a torque control value TRR limited as based on motor temperature T and the set upper temperature limit.

Unit 206 receives torque control value TRR from torque limitation control unit 204, voltage Vm from voltage sensor 40 and motor current MCRT from current sensor 50, calculates therefrom a voltage applied to each of the U, V and W phase coils of motor generator MG, and outputs each calculated phase coil voltage to PWM signal conversion unit 208.

PWM signal conversion unit 208 receives each phase coil voltage from unit 206, generates therefrom a pulse width modulation (PWM) signal for turning on/off each transistor of inverter 10, and outputs the generated PWM signal as signal PWI to each transistor of inverter 10.

Note that ECU 20 operates to protect motor generator MG in such a manner that when motor temperature T approaches the set upper temperature limit torque limitation control unit 204 decreases a torque control value for motor generator MG.

Motor generator MG has its upper temperature limit set by upper temperature limit setting unit 202, which normally sets the upper temperature limit of motor generator MG at TS1. Herein if torque control value TR is larger than threshold value TRth and vehicular speed SV is lower than threshold value SVth, upper temperature limit setting unit 202 determines that while the vehicle is running uphill it may fall downhill, and upper temperature limit setting unit 202 sets the upper temperature limit of motor generator MG at TS2 higher than normal to alleviate limiting the torque of motor generator MG by torque limitation control unit 204.

Raising the upper temperature limit of motor generator MG from TS1 to TS2 may result in motor generator MG bearing a large temperature burden. However, it is rare that motor generator MG has motor temperature T exceeding upper temperature limit TS1, and if motor temperature T exceeds upper temperature limit TS1, motor temperature T can be held not to exceed upper temperature limit TS2, and motor generator MG is substantially unaffected in longevity.

In a state in which motor temperature T exceeds upper temperature limit TS1, which is rare, changing normal upper temperature limit TS1 to upper temperature limit TS2 higher than upper temperature limit TS1 to provide the vehicle with an opportunity to avoid falling downhill would be more advantageous than setting the upper temperature limit of motor generator MG uniformly regardless of the vehicle's state and thus only protecting motor generator MG from high temperature.

Figure 3:
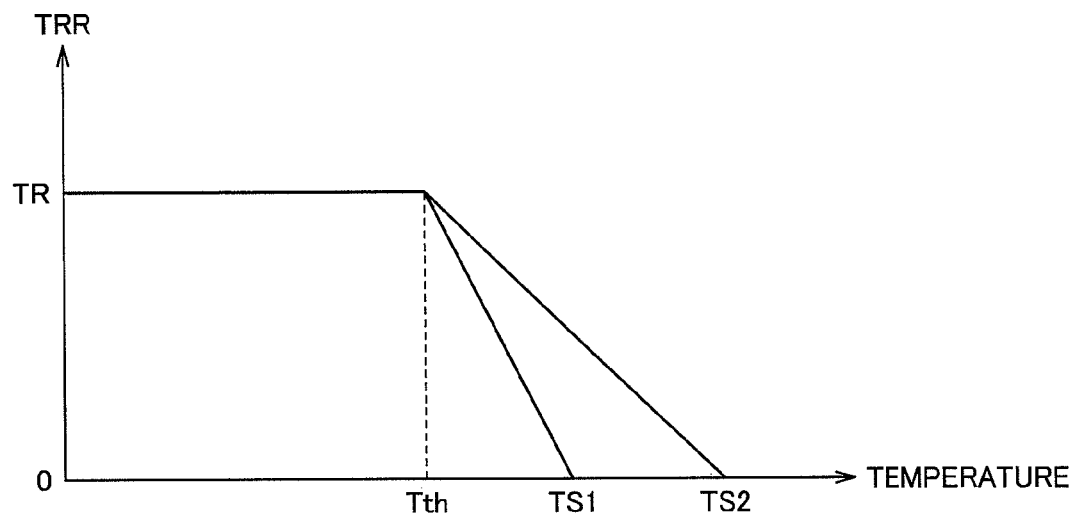
FIG. 3 is a diagram for illustrating limiting a torque of a motor generator by a torque limitation control unit shown in FIG. 2.

FIG. 3 is diagram for illustrating limiting a torque of motor generator MG by torque limitation control unit 204 shown in FIG. 2. With reference to FIG. 3, the horizontal axis represents motor temperature T of motor generator MG and the vertical axis represents torque control value TRR for motor generator MG. When motor temperature T is at most a preset threshold value Tth, torque limitation control unit 204 outputs torque control value TR, exactly as received from the external ECU, as torque control value TRR to unit 206.

If motor temperature T exceeds preset threshold value Tth torque limitation control unit 204 limits a torque control value to allow torque control value TRR to be zero for the upper temperature limit set by upper temperature limit setting unit 202. If torque control value TR is larger than threshold value TRth and vehicular speed SV is smaller than threshold value SVth torque limitation control unit 204 limits a torque control value to allow torque control value TRR to be zero for upper temperature limit TS2 higher than normal upper temperature limit TS1.

More specifically, when the vehicle is running uphill, and may fall downhill, the upper temperature limit of motor generator MG is alleviated, and as a result, limiting a torque of motor generator MG is alleviated.

Figure 4:
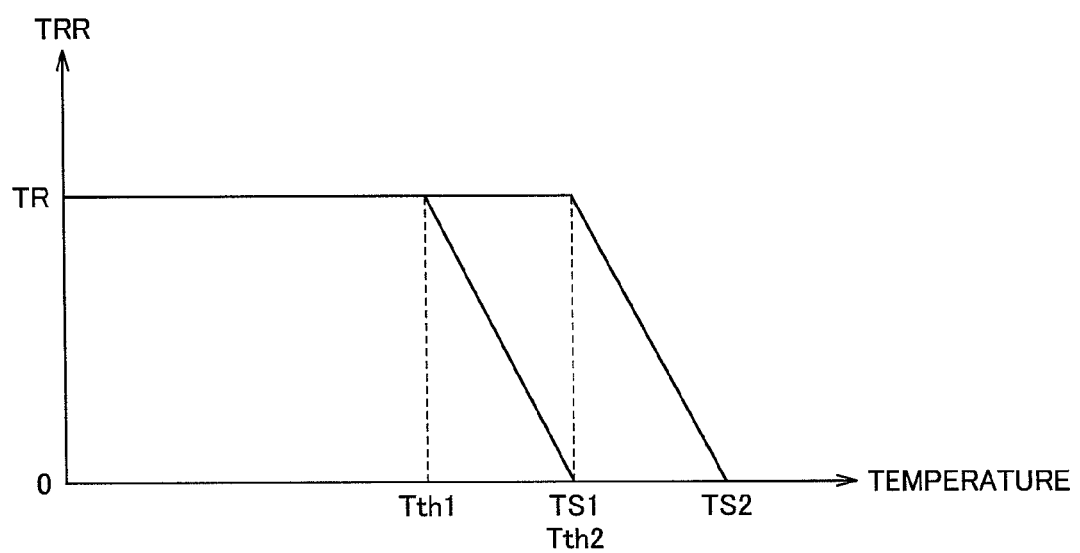
FIG. 4 is a diagram for illustrating another method of limiting a torque by the torque limitation control unit.

Note that as shown in FIG. 4, as a setting of the upper temperature limit of motor generator MG is changed, the threshold value in temperature at which limiting a torque starts may accordingly be changed from Tth1 to Tth2 higher than Tth1.

Figure 5:
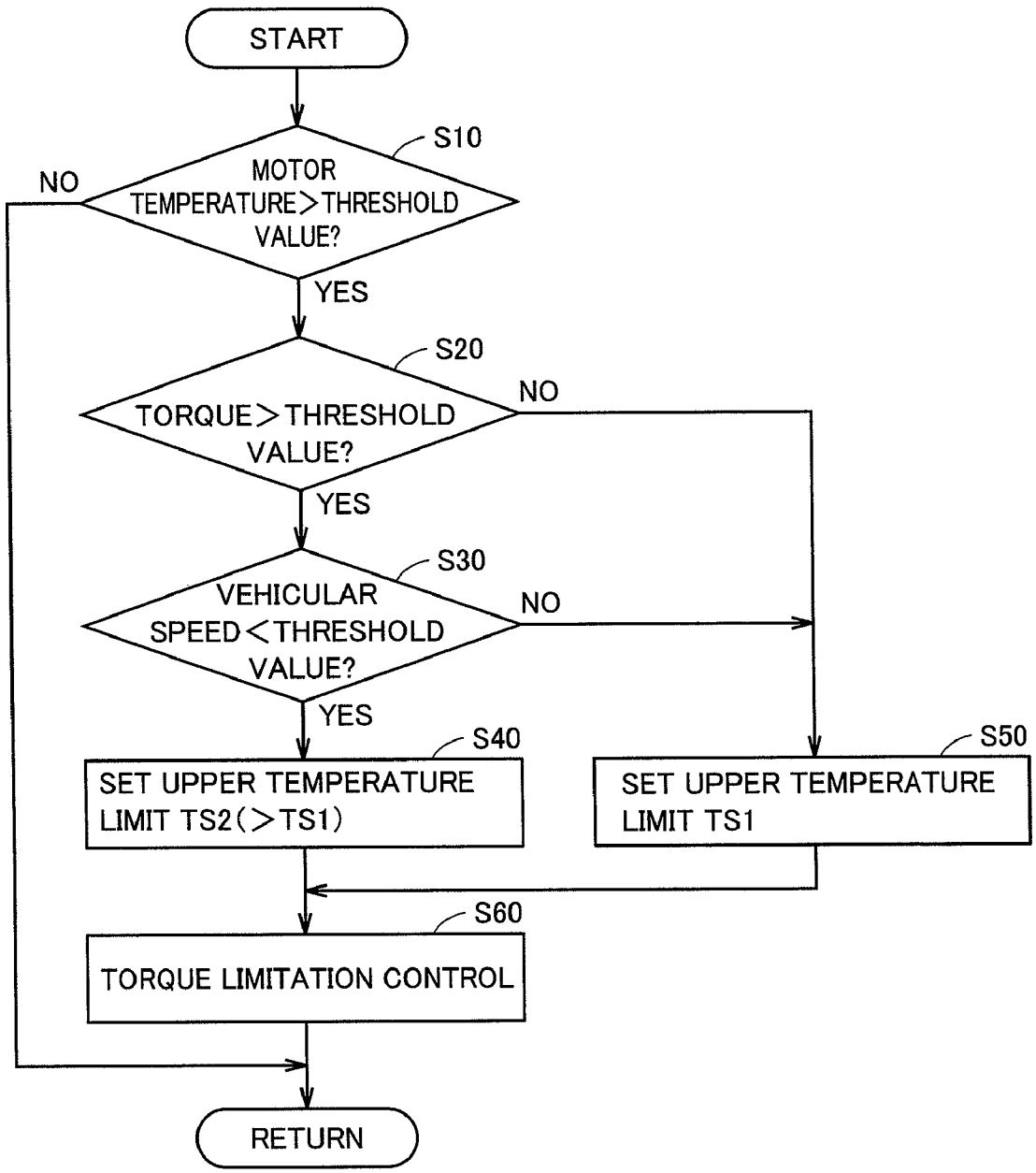
FIG. 5 is a flowchart of torque limitation control performed by the ECU shown in FIG. 1.

FIG. 5 is a flowchart of how ECU 20 shown in FIG. 1 exerts the torque limitation control. Note that the process shown in this flowchart is invoked from a main routine and executed for each fixed time or whenever a predetermined condition is established.

With reference to FIG. 5, ECU 20 obtains motor temperature T of motor generator MG from temperature sensor 30 and determines whether motor temperature T exceeds threshold temperature Tth (step S10). If not (NO at step S10), torque control value TR issued from the external ECU is not limited and the process ends.

If at step S10 ECU 20 determines that motor temperature T is higher than threshold temperature Tth (YES at step S10), ECU 20 determines whether torque control value TR is larger than preset threshold value TRth (step S20). If not (NO at S20) ECU 20 sets upper temperature limit TS1 as the upper temperature limit of motor generator MG (step S50).

If at step S20 ECU 20 determines that torque control value TR is larger than threshold value TRth (YES at S20) ECU 20 determines whether vehicular speed SV is smaller than preset threshold value SVth (step S30). If not (NO at S30) ECU 20 proceeds to step S50.

If at step S30 ECU 20 determines that vehicular speed SV is smaller than threshold value SVth (YES at S30) ECU 20 sets as the upper temperature limit of motor generator MG upper temperature limit TS2 higher than upper temperature limit TS1 (step S40). In other words, when torque control value TR is larger than threshold value TRth and vehicular speed SV is smaller than threshold value SVth, ECU 20 determines that the vehicle may fall downhill while it is running uphill, and ECU 20 sets upper temperature limit TS2 higher than normal upper temperature limit TS1 as the upper temperature limit of motor generator MG in the torque limitation control.

At step S40 or S50 the upper temperature limit of motor generator MG is set, and ECU 20 exerts the torque limitation control to limit a torque control value for motor generator MG, as based on upper temperature limit TS1 or TS2 as set and motor temperature T received from temperature sensor 30 (step S60).

Thus in the first embodiment when motor generator MG provides large torque and the vehicle has low vehicular speed, a decision is made that the vehicle may fall downhill while it is running uphill. Upper temperature limit setting unit 202 sets upper temperature limit TS2 higher than normally set upper temperature limit TS1 in torque limitation control unit 204. Motor generator MG has its set upper temperature limit raised to alleviate limiting a torque of motor generator MG. Thus in the first embodiment the possibility can be increased that the vehicle can avoid falling downhill.

Second Embodiment

A second embodiment provides a motored vehicle having a power train identical in configuration to that of motored vehicle 100 described in the first embodiment with reference to FIG. 1.

Figure 6:
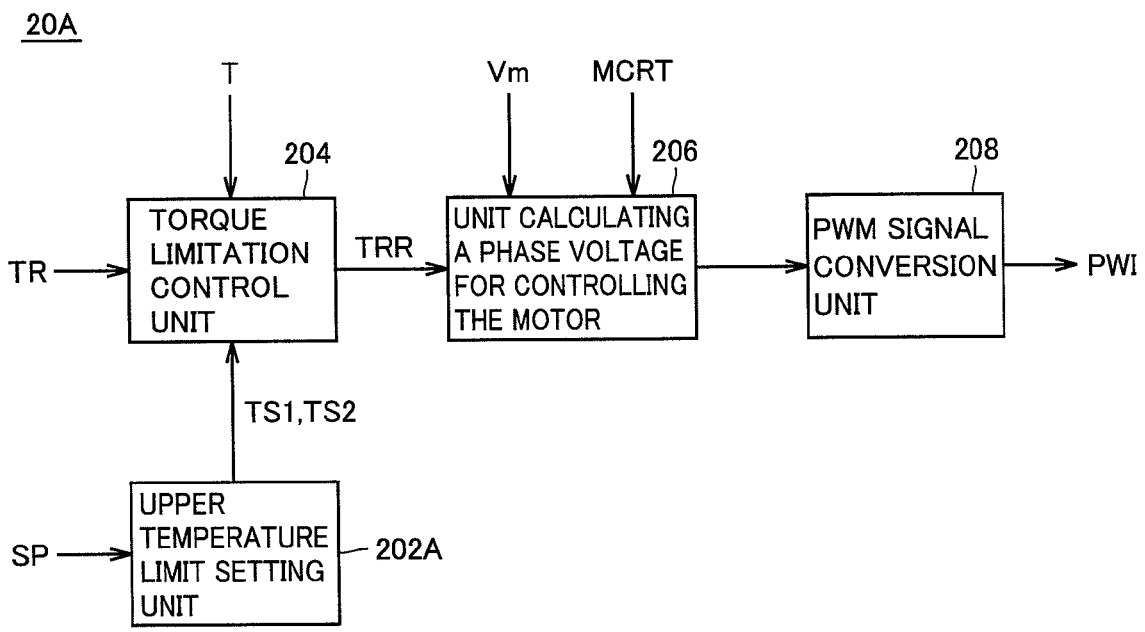
FIG. 6 is a functional block diagram of an ECU in a second embodiment of the present invention.

FIG. 6 is a functional block diagram of an ECU in the second embodiment of the present invention. With reference to FIG. 6, an ECU 20A corresponds in configuration to ECU 20 described in the first embodiment with reference to FIG. 2 except that upper temperature limit setting unit 202 is replaced with an upper temperature limit setting unit 202A.

Upper temperature limit setting unit 202A sets the upper temperature limit of motor generator MG as based on shift position signal SP indicating a position selected with a shift lever and outputs the set upper temperature limit to torque limitation control unit 204. More specifically, for a shift position in a range other than a reverse (R) range, upper temperature limit setting unit 202A sets the upper temperature limit of motor generator MG at TS1. For a shift position in the reverse (R) range, upper temperature limit setting unit 202A sets the upper temperature limit of motor generator MG at TS2 higher than TS1.

The remainder of ECU 20A in configuration is identical to that of ECU 20 described in the first embodiment with reference to FIG. 2.

ECU 20A operates to protect motor generator MG in such a manner that when motor temperature T approaches a set upper temperature limit torque limitation control unit 204 decreases a torque control value for motor generator MG.

Motor generator MG has its upper temperature limit set by upper temperature limit setting unit 202A, which normally sets the upper temperature limit of motor generator MG at TS1. Herein, for a shift position in the reverse (R) range, upper temperature limit setting unit 202A determines that the vehicle may fall downhill while it proceeds tail first to run uphill, and upper temperature limit setting unit 202A sets the upper temperature limit of motor generator MG at TS2 higher than normal to alleviate limiting the torque of motor generator MG by torque limitation control unit 204.

Figure 7:
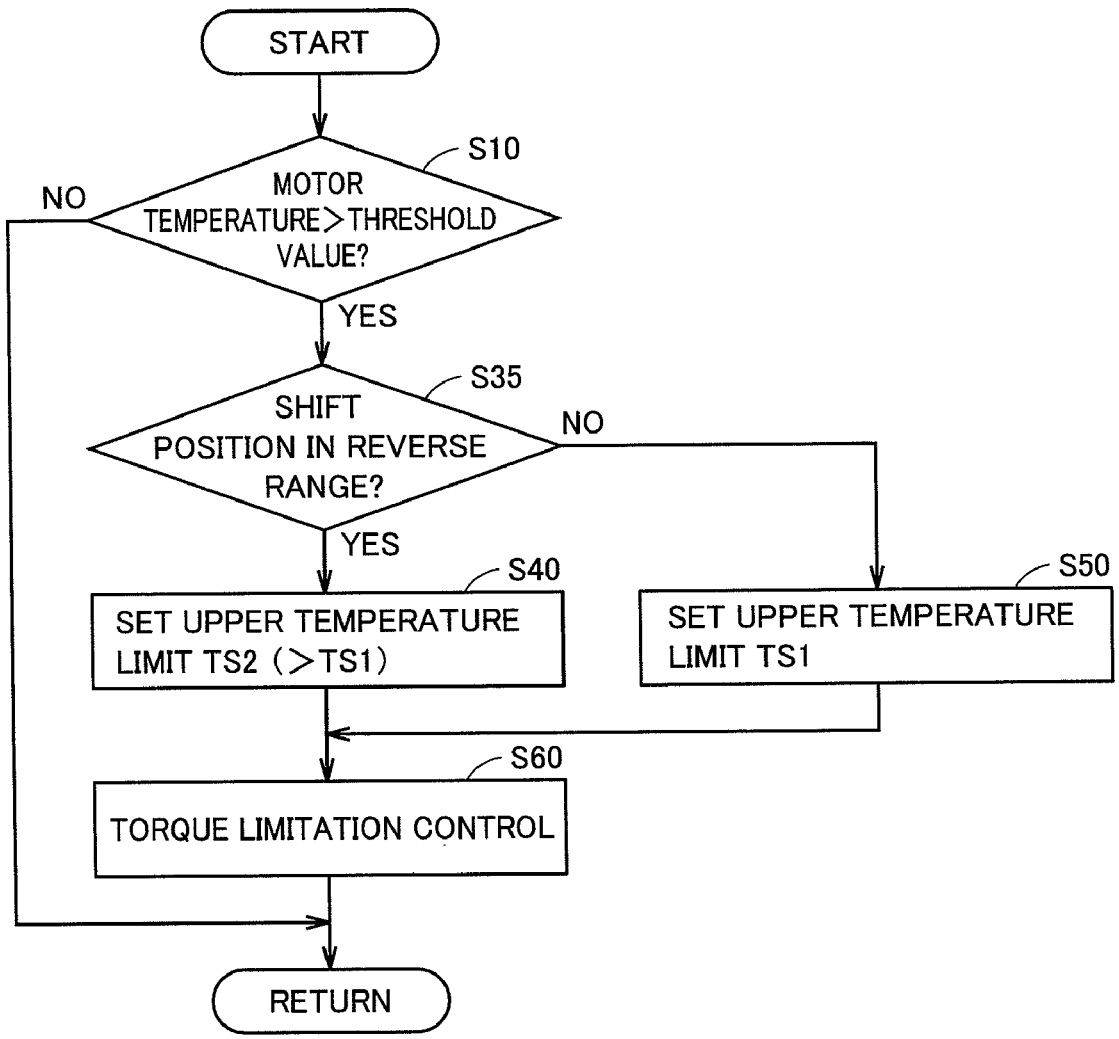
FIG. 7 is a flowchart of torque limitation control performed by the ECU in the second embodiment of the present invention.

FIG. 7 is a flowchart of torque limitation control performed by ECU 20A in the second embodiment of the present invention. This flowchart shows a process, which is also invoked from a main routine and executed for each fixed time or whenever a predetermined condition is established.

With reference to FIG. 7, this flowchart shows a process corresponding to that shown in FIG. 5 having steps S20 and S30 replaced with step S35. More specifically, if at step S10 a decision is made that motor temperature T is higher than threshold value Tth (YES at S10), ECU 20A determines from shift position signal SP whether the shift position is in the reverse (R) range (step S35). If ECU 20A determines that the shift position is in a range other than the reverse (R) range (NO at S35), ECU 20A proceeds to step S50 to set the upper temperature limit of motor generator MG at upper temperature limit TS1.

If at step S35 a decision is made that the shift position is in the reverse (R) range (YES at S35) ECU 20A proceeds to step S40 and sets the upper temperature limit of motor generator MG at upper temperature limit TS2 higher than upper temperature limit TS1. In other words, for a shift position in the reverse (R) range, ECU 20A determines that the vehicle may fall downhill while it proceeds tail first to run uphill, and in torque limitation control, ECU 20A sets the upper temperature limit of motor generator MG at upper temperature limit TS2 higher than normal upper temperature limit TS1.

Thus in the second embodiment a state with a shift position in the reverse (R) range is determined as a state in which the vehicle may fall downhill while it proceeds tail first to run uphill. At the time, upper temperature limit setting unit 202A sets upper temperature limit TS2 higher than normally set upper temperature limit TS1 in torque limitation control unit 204. Motor generator MG thus has its set upper temperature limit raised to alleviate limiting a torque of motor generator MG. Thus in the second embodiment the possibility can be increased that a vehicle proceeding tail first to run uphill can avoid falling downhill.

Note that in the second embodiment the present invention is a vehicle equipped with a motor generator and in addition an internal combustion engine as a source of motive power. It is usefully applied to a vehicle driven solely on the driving power of the motor generator in proceeding tail first, since when the vehicle is operated to proceed tail first to run uphill and may roll forward or downhill, the vehicle can be provided with an opportunity to avoid rolling forward or downhill.

Third Embodiment

In the first and second embodiments, when a vehicle may fall downhill, the upper temperature limit of motor generator MG is alleviated to alleviate limiting a torque. In the third and following embodiments, when a vehicle may fall downhill, a torque reduction rate per unit time is varied to allow a torque to decrease in an increased period of time to a limit value that corresponds to a motor temperature. This can provide an increased possibility of avoiding rapidly limiting the torque to the limit value so that the vehicle may fall downhill.

The third embodiment provides a motored vehicle including a power train identical in configuration to that of motored vehicle 100 as described in the first embodiment with reference to FIG. 1.

Figure 8:
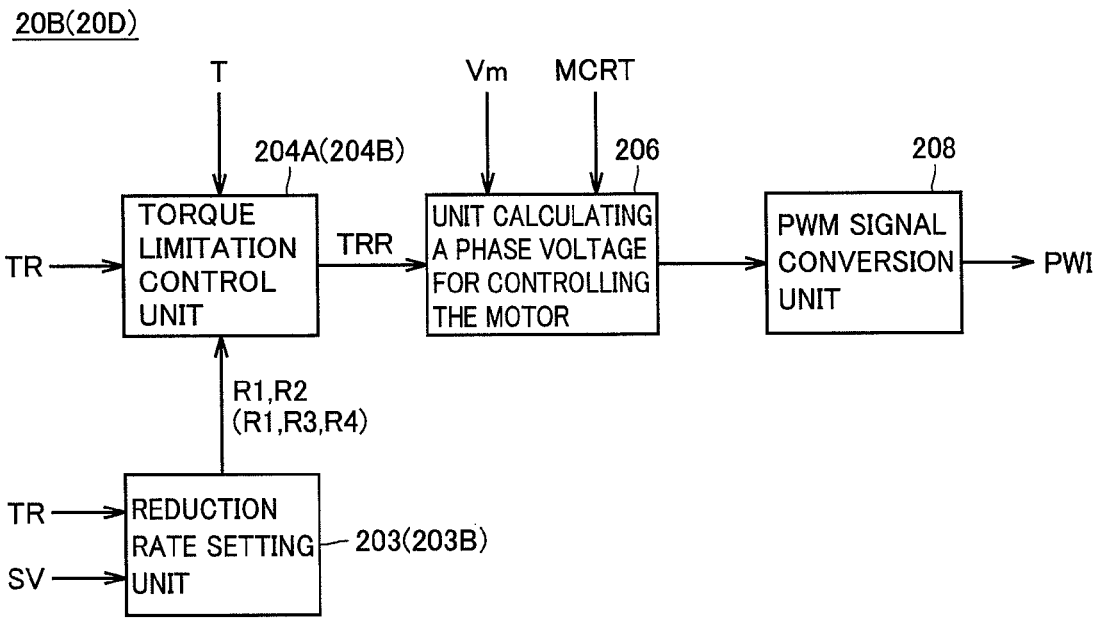
FIG. 8 is a functional block diagram of an ECU in a third embodiment of the present invention.

FIG. 8 is a functional block diagram of an ECU in the third embodiment of the present invention. With reference to FIG. 8, an ECU 20B corresponds in configuration to ECU 20 described in the first embodiment with reference to FIG. 2 except that upper temperature limit setting unit 202 and torque limitation control unit 204 are replaced with a reduction rate setting unit 203 and a torque limitation control unit 204A, respectively.

Reduction rate setting unit 203 sets as based on torque control value TR for motor generator MG and vehicular speed SV a torque reduction rate per unit time applied in torque limitation control performed by torque limitation control unit 204A, and outputs the set reduction rate to torque limitation control unit 204A. More specifically, if torque control value TR is at most the preset threshold value TRth or vehicular speed SV is at least the preset threshold value SVth, reduction rate setting unit 203 sets a torque reduction rate at R1. If torque control value TR is larger than threshold value TRth and vehicular speed SV is lower than threshold value SVth, reduction rate setting unit 203 sets a torque reduction rate at R2 lower than R1.

In accordance with the reduction rate set by reduction rate setting unit 203, torque limitation control unit 204A controls limiting a torque, as based on motor temperature T of motor generator MG and a preset upper temperature limit. More specifically, when motor generator MG has motor temperature T approaching the set upper temperature limit, torque limitation control unit 204A decreases torque control value TR received from the external ECU, at a reduction rate received from reduction rate setting unit 203. Torque limitation control unit 204A outputs to unit 206 torque control value TRR limited as based on motor temperature T and the set upper temperature limit.

The remainder of ECU 20B in configuration is identical to that of ECU 20 described in the first embodiment with reference to FIG. 2.

Figure 9:
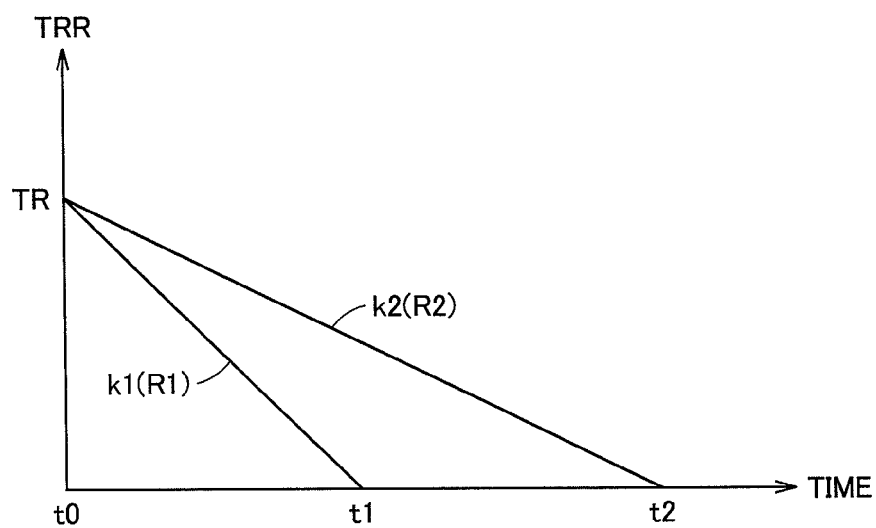
FIG. 9 is a diagram for illustrating limiting a torque of a motor generator by the torque limitation control unit shown in FIG. 8.

FIG. 9 is a diagram for illustrating limiting a torque of motor generator MG by torque limitation control unit 204A shown in FIG. 8. With reference to FIG. 9, the horizontal axis represents time and the vertical axis represents torque control value TRR for motor generator MG. Lines k1 and k2 indicate how torque control value TRR varies when reduction rate setting unit 203 sets reduction rates R1 and R2, respectively.

At time t0 motor temperature T exceeds the preset threshold value Tth. In response, torque limitation control unit 204A limits a torque to decrease torque control value TRR at a reduction rate received from reduction rate setting unit 203. Herein if torque control value TR is larger than threshold value TRth and vehicular speed SV is lower than threshold value SVth, torque limitation control unit 204A decreases a torque control value at reduction rate R2 lower than normal reduction rate R1. Thus when the vehicle is running uphill, and may fall downhill, a period of time in which a torque control value is decreased to a limit value corresponding to motor temperature T is increased.

Thus in the third embodiment when the vehicle is running uphill and may fall downhill, a torque reduction rate applied in torque limitation control is changed from normal reduction rate R1 to reduction rate R2 lower than reduction rate R1. Thus in the third embodiment a torque control value can be decreased to a limit value that corresponds to motor temperature T in an increased period of time to increase the possibility that the vehicle can avoid falling downhill.

Fourth Embodiment

The fourth embodiment provides a motored vehicle having a power train identical in configuration to that of motored vehicle 100 described in the first embodiment with reference to FIG. 1.

Figure 10:
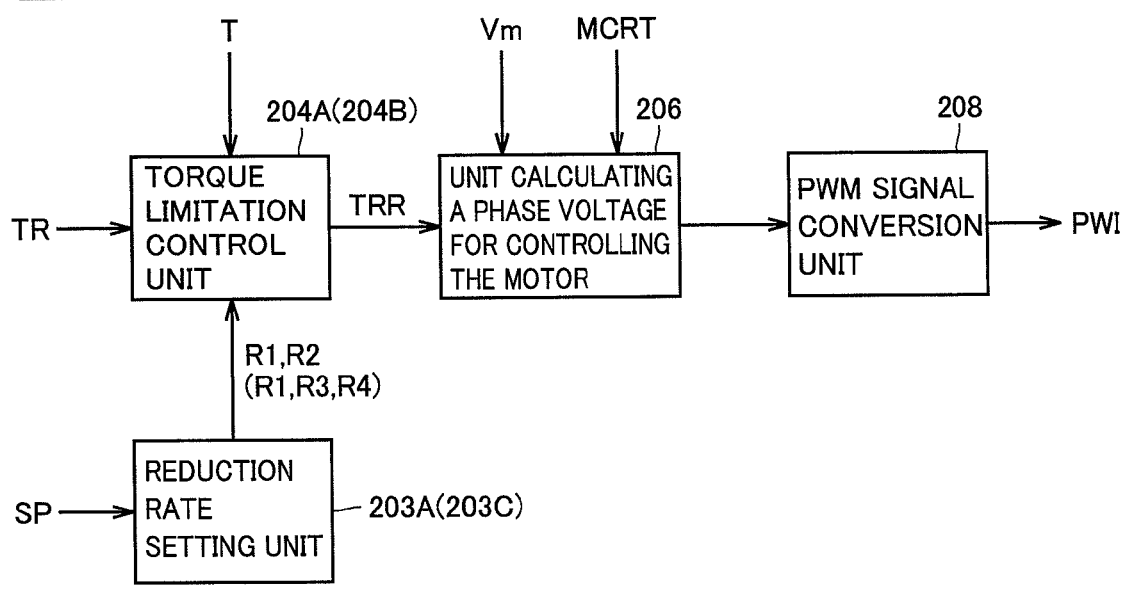
FIG. 10 is a functional block diagram of an ECU in a fourth embodiment of the present invention.

FIG. 10 is a functional block diagram of an ECU in the fourth embodiment of the present invention. With reference to FIG. 10, an ECU 20C corresponds in configuration to ECU 20B described in the third embodiment with reference to FIG. 8 except that reduction rate setting unit 203 is replaced with a reduction rate setting unit 203A.

Reduction rate setting unit 203A sets as based on shift position signal SP indicating a position selected with a shift lever a torque reduction rate per unit time applied in torque limitation control performed by torque limitation control unit 204A, and outputs the set reduction rate to torque limitation control unit 204A. More specifically, for a shift position in a range other than the reverse (R) range, reduction rate setting unit 203A sets a torque reduction rate at R1. For a shift position in the reverse (R) range, reduction rate setting unit 203A sets a torque reduction rate at R2 lower than R1.

The remainder of ECU 20C in configuration is identical to that of ECU 20B described in the third embodiment with reference to FIG. 8.

Thus in the fourth embodiment when a vehicle is proceeding tail first to run uphill and may fall downhill, a torque reduction rate applied in torque limitation control is changed from normal reduction rate R1 to reduction rate R2 lower than reduction rate R1. Thus in the fourth embodiment a torque control value can be decreased to a limit value that corresponds to motor temperature T in an increased period of time to increase the possibility that the vehicle proceeding tail first to run uphill can avoid falling downhill.

Fifth Embodiment

In the third and fourth embodiments, when a vehicle may fall downhill, a torque reduction rate per unit time is decreased to be smaller than normal to allow a torque to decrease in an increased period of time to a limit value corresponding to a motor temperature. Thus the third and fourth embodiments tolerate that motor generator MG increases in temperature to a considerable extent. In the fifth embodiment and the following sixth embodiment, when a vehicle may fall downhill, a period of time in which a torque is decreased to a limit value corresponding to a motor temperature is increased to be longer than normal, and elevation in temperature of motor generator MG is also given consideration in setting a reduction rate.

The fifth embodiment provides a motored vehicle having a power train identical in configuration to that of motored vehicle 100 described in the first embodiment with reference to FIG. 1.

Referring again to FIG. 8, the fifth embodiment provides an ECU 20D corresponding in configuration to ECU 20B described in the third embodiment except that reduction rate setting unit 203 and torque limitation control unit 204A are replaced with a reduction rate setting unit 203B and a torque limitation control unit 204B, respectively.

Reduction rate setting unit 203B sets as based on torque control value TR for motor generator MG and vehicular speed SV a torque reduction rate per unit time applied in torque limitation control performed by torque limitation control unit 204B, and outputs the set reduction rate to torque limitation control unit 204B. More specifically, if torque control value TR is at most threshold value TRth or vehicular speed SV is at least threshold value SVth, reduction rate setting unit 203B sets a torque reduction rate at R1. If torque control value TR is larger than threshold value TRth and vehicular speed SV is lower than threshold value SVth, reduction rate setting unit 203B sets two reduction rates, i.e., a torque reduction rate R3 higher than R1 and a torque reduction rate R4 lower than R1.

In accordance with the reduction rates set by reduction rate setting unit 203B, torque limitation control unit 204B controls limiting a torque, as based on motor temperature T of motor generator MG and a preset upper temperature limit. More specifically, when motor temperature T approaches the set upper temperature limit, torque limitation control unit 204B decreases torque control value TR received from the external ECU, at the reduction rates received from reduction rate setting unit 203B.

Herein when torque limitation control unit 204B receives the two reduction rates R3 and R4 from reduction rate setting unit 203B, torque limitation control unit 204B decreases a torque control value in two steps to a torque limit determined as based on motor temperature T and the set upper temperature limit. More specifically, torque limitation control unit 204B decreases the torque control value to the torque limit by initially decreasing the torque control value at reduction rate R3 higher than normal reduction rate R1 and subsequently decreasing the torque control value at reduction rate R4 lower than normal reduction rate R1. Then torque limitation control unit 204B outputs to unit 206 torque control value TRR limited as based on motor temperature T and the set upper temperature limit.

Figure 11:
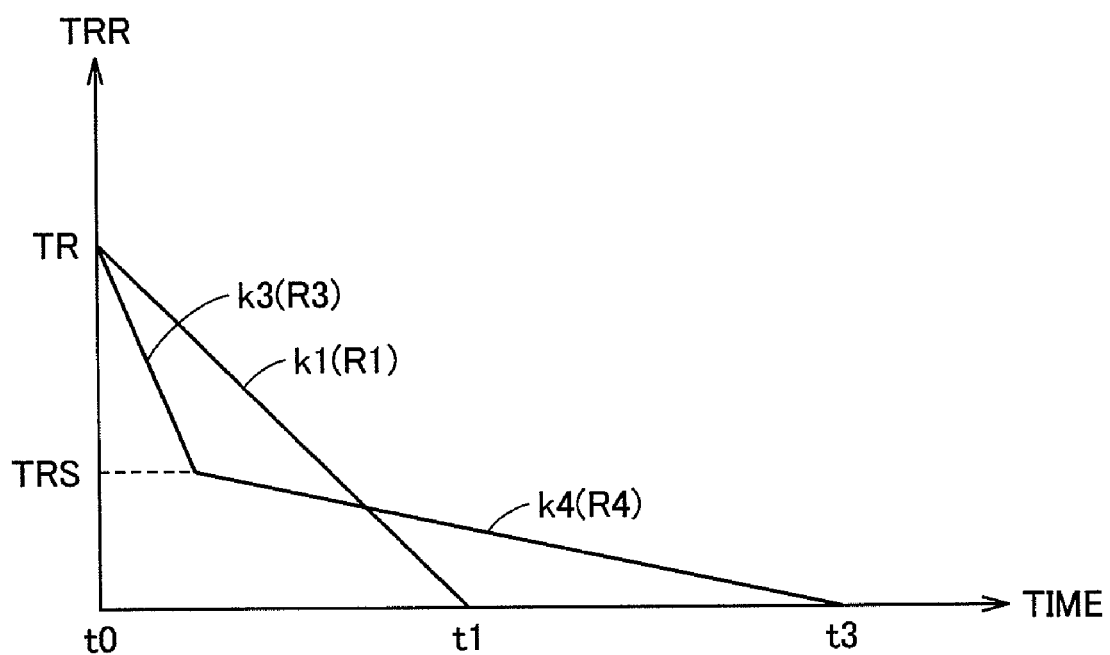
FIG. 11 is a diagram for illustrating limiting a torque of a motor generator by a torque limitation control unit in a fifth embodiment.

FIG. 11 is a diagram for illustrating limiting a torque of motor generator MG by torque limitation control unit 204B in the fifth embodiment. With reference to FIG. 11, the horizontal axis represents time and the vertical axis represents torque control value TRR for motor generator MG. A line k1 indicates how torque control value TRR varies when reduction rate setting unit 203B sets reduction rate R1, and lines k3 and k4 indicate how torque control value TRR varies when reduction rate setting unit 203B sets reduction rates R3 and R4, respectively.

At time t0 motor temperature T exceeds threshold value Tth. In response, torque limitation control unit 204B limits a torque to decrease torque control value TRR at a reduction rate received from reduction rate setting unit 203B. Herein if torque control value TR is larger than threshold value TRth and vehicular speed SV is lower than threshold value SVth, torque limitation control unit 204B decreases the torque control value at reduction rate R3 higher than normal reduction rate R1 at least until a torque TRS at which the vehicle cannot fall downhill is attained. Thereafter torque limitation control unit 204B decreases the torque control value at reduction rate R4 lower than reduction rate R1.

Thus when torque control value TR is larger than threshold value TRth and vehicular speed SV is lower than threshold value SVth, i.e., when a vehicle may fall downhill, a torque reduction rate per unit time is divided in two stages. This is in order to consider protecting the motor from high temperature and also allow a torque control value to be decreased to in an increased period of time to a limit value corresponding to motor temperature T. More specifically, if motor temperature T exceeds threshold value Tth, a torque control value is initially decreased at reduction rate R3 higher than normal reduction rate R1 to significantly decrease the motor's temperature elevation rate and subsequently decreased at reduction rate R4 lower than normal reduction rate R1 to ensure that the decreasing torque control value reaches the limit value corresponding to motor temperature T in an appropriate period of time.

Thus in the fifth embodiment when a vehicle running uphill may fall downhill, a torque reduction rate applied in torque limitation control is divided in two steps, i.e., reduction rate R3 (>R1) and reduction rate R4 (<R1) to decrease a torque. Thus in the fifth embodiment a torque control value can be decreased to a limit value that corresponds to motor temperature T in an increased period of time to increase the possibility that the vehicle can avoid falling downhill and also to reduce elevation in temperature of motor generator MG.

Sixth Embodiment

A sixth embodiment provides a motored vehicle having a power train identical in configuration to that of motored vehicle 100 described in the first embodiment with reference to FIG. 1.

Referring again to FIG. 10, the sixth embodiment provides an ECU 20E corresponding in configuration to ECU 20C described in the fourth embodiment except that reduction rate setting unit 203A and torque limitation control unit 204A are replaced with a reduction rate setting unit 203C and a torque limitation control unit 204B.

Reduction rate setting unit 203C sets as based on shift position signal SP indicating a position selected with a shift lever a torque reduction rate per unit time applied in torque limitation control performed by torque limitation control unit 204B, and outputs the set reduction rate to torque limitation control unit 204B. More specifically, for a shift position in a range other than the reverse (R) range, reduction rate setting unit 203C sets a torque reduction rate at R1. For a shift position in the reverse (R) range, reduction rate setting unit 203C sets two reduction rates, i.e., reduction rate R3 higher than reduction rate R1 and reduction rate R4 lower than reduction rate R1.

Torque limitation control unit 204B is as described in the fifth embodiment. Torque limitation control unit 204B controls a torque of motor generator MG, as has been described with reference to FIG. 11.

Thus, in the sixth embodiment, when a vehicle proceeding tail first to run uphill may fall downhill, a torque reduction rate applied in torque limitation control is divided in two steps, i.e., at reduction rate R3 (>R1) and reduction rate R4 (<R1) to decrease a torque. Thus in the sixth embodiment a torque control value can be decreased to a limit value that corresponds to motor temperature T in an increased period of time to increase the possibility that the vehicle proceeding tail first to run uphill can avoid falling downhill and also to reduce elevation in temperature of motor generator MG.

In the fifth and sixth embodiments, a torque reduction rate applied in torque limitation control is divided in two stages to decrease a torque. Alternatively, it may be done so in more than two stages or steplessly to decrease a torque. More specifically, a torque may be decreased to a limit value in such a manner that a reduction rate is initially set to be higher than normal and is subsequently decreased stepwise or steplessly.

In the first, third and fifth embodiments, an upper temperature limit or a torque reduction rate per unit time are switched as based on torque control value TR and vehicular speed SV. Alternatively, torque control value TR may be replaced with an actual numerical value of a torque as detected with a torque sensor, motor current MCRT passed to motor generator MG, and the like.

In the second, fourth and sixth embodiments, an upper temperature limit or a torque reduction rate per unit time are switched as based on whether a shift position is in the reverse (R) range. Alternatively, it may be done by determining in which direction motor generator MG rotates and determining therefrom whether the vehicle is proceeding tail first.

While the above described embodiments have each described a motored vehicle driving wheel DW by motor generator MG, the present invention is also applicable to a range including a hybrid vehicle equipped with an internal combustion engine as a source of motive power, and a fuel cell automobile equipped with a fuel cell in place of power storage device B as a direct current power supply.

Furthermore between power storage device B and inverter 10 there may be provided an upconverter receiving a direct current voltage from power storage device B, upconverting the voltage, and supplying the upconverted voltage to inverter 10.

In the above description, motor generator MG corresponds to a "motor" in the present invention. Temperature sensor 30 corresponds to a "temperature detection unit" in the present invention. Torque limitation control units 204, 204A and 204B each correspond to a "torque limitation unit" in the present invention. Upper temperature limit setting units 202 and 202A each correspond to a "setting unit determining the upper temperature limit of the motor, as based on a state of the vehicle, and setting the determined upper temperature limit in the torque limitation unit" in the present invention. Reduction rate setting units 203 and 203A-203C each correspond to a "setting unit determining a reduction rate, as based on a state of the vehicle, and setting the determined reduction rate in the torque limitation unit" in the present invention.

It should be understood that the embodiment disclosed herein is illustrative and non-restrictive in any respect. The scope of the present invention is defined by the terms of the claims, rather than the description above, and is intended to include any modifications within the scope and meaning equivalent to the terms of the claims.

The invention claimed is:

1. A motor control device controlling a motor generating a force driving a vehicle, comprising:
   temperature detection means for detecting a temperature of said motor;
   torque limitation means for limiting a torque of said motor, as based on the temperature detected by said temperature detection means and an upper temperature limit of said motor; and setting means for determining the upper temperature limit of said motor, as based on a state of said vehicle, and setting the determined upper temperature limit in said torque limitation means;

wherein the state of said vehicle includes at least one of a speed of said vehicle, said torque, and a shift position.

2. The motor control device according to claim 1, wherein when said torque is larger than a first threshold value and said speed is lower than a second threshold value said setting means sets in said torque limitation means a second upper temperature limit higher than a normally set, first upper temperature limit.

3. The motor control device according to claim 1, wherein when said shift position is in a reverse range said setting means sets in said torque limitation means a second upper temperature limit higher than a normally set, first upper temperature limit.

4. A motored vehicle comprising:
a motor generating a force driving a vehicle;
a wheel mechanically linked with an output shaft of said motor; and
the motor control device of claim 1.

5. A motor control device controlling a motor generating a force driving a vehicle, comprising:
temperature detection means for detecting a temperature of said motor;
torque limitation means for limiting a torque of said motor, as based on the temperature detected by said temperature detection means and an upper temperature limit of said motor, at a set reduction rate per unit time; and
setting means for determining said reduction rate, as based on a state of said vehicle, and setting the determined reduction rate in said torque limitation means;
wherein the state of said vehicle includes at least one of a speed of said vehicle, said torque, and a shift position.

6. The motor control device according to claim 5, wherein:
when said torque limitation means decreases said torque said torque limitation means decreases said torque to a limit value determined by the detected temperature; and
when said torque is larger than a first threshold value and said speed is lower than a second threshold value said setting means sets said reduction rate in said torque limitation means so that a period of time that passes after said torque starts to decrease before said torque reaches said limit value is longer than normal.

7. The motor control device according to claim 5, wherein:
when said torque limitation means decreases said torque said torque limitation means decreases said torque to a limit value determined by the detected temperature; and
when said shift position is in a reverse range said setting means sets said reduction rate in said torque limitation means so that a period of time that passes after said torque starts to decrease before said torque reaches said limit value is longer than normal.

8. The motor control device according to claim 6, wherein said setting means sets in said torque limitation means a second reduction rate lower than a normally set, first reduction rate.

9. The motor control device according to claim 6, wherein when said torque starts to decrease, said setting means initially sets in said torque limitation means a third reduction rate higher than a normally set, first reduction rate, and subsequently sets in said torque limitation means a fourth reduction rate lower than said first reduction rate.

10. A motor control device controlling a motor generating a force driving a vehicle, comprising:
a temperature detection unit detecting a temperature of said motor; and
a controller performing a series of steps,
said controller determining an upper temperature limit of said motor, as based on a state of said vehicle, and limiting a torque of said motor, as based on the temperature detected by said temperature detection unit and said upper temperature limit;
wherein the state of said vehicle includes at least one of a speed of said vehicle, said torque, and a shift position.

11. The motor control device according to claim 10, wherein when said torque is larger than a first threshold value and said speed is lower than a second threshold value said controller sets said upper temperature limit at a second upper temperature limit higher than a normal, first upper temperature limit.

12. The motor control device according to claim 10, wherein when said shift position is in a reverse range said controller sets said upper temperature limit at a second upper temperature limit higher than a normal, first upper temperature limit.

13. A motor control device controlling a motor generating a force driving a vehicle, comprising:
a temperature detection unit detecting a temperature of said motor; and
a controller performing a series of steps,
said controller determining a reduction rate per unit time of a torque of said motor, as based on a state of said vehicle, and limiting at the determined reduction rate the torque of said motor, as based on the temperature detected by said temperature detection unit and an upper temperature limit of said motor;
wherein said state of said vehicle includes at least one of a speed of said vehicle, said torque, and a shift position.

14. The motor control device according to claim 13, wherein when said controller decreases said torque, said controller decreases said torque to a limit value determined by the detected temperature, and when said torque is larger than a first threshold value and said speed is lower than a second threshold value, said controller determines said reduction rate so that a period of time that passes after said torque starts to decrease before said torque reaches said limit value is longer than normal.

15. The motor control device according to claim 13, wherein when said controller decreases said torque, said controller decreases said torque to a limit value determined by the detected temperature, and when said shift position is in a reverse range said controller determines said reduction rate so that a period of time that passes after said torque starts to decrease before said torque reaches said limit value is longer than normal.

16. The motor control device according to claim 14, wherein said controller sets said reduction rate at a second reduction rate lower than a normal, first reduction rate.

17. The motor control device according to claim 14, wherein when said torque starts to decrease, said controller sets said reduction rate at a third reduction rate higher than a normal, first reduction rate, and subsequently sets said reduction rate at a fourth reduction rate lower than said first reduction rate.

18. A method of controlling a motor generating a force driving a vehicle, comprising the steps of:
determining an upper temperature limit of said motor, as based on a state of said vehicle; and
limiting a torque of said motor, as based on a temperature of said motor as detected and said upper temperature limit;

wherein the state of said vehicle includes at least one of a speed of said vehicle, said torque, and a shift position.

19. The method according to claim 18, wherein the step of determining includes setting said upper temperature limit at a second upper temperature limit higher than a normal, first upper temperature limit when said torque is larger than a first threshold value and said speed is lower than a second threshold value.

20. The method according to claim 18, wherein the step of determining includes setting said upper temperature limit at a second upper temperature limit higher than a normal, first upper temperature limit when said shift position is in a reverse range.

* * * * *